US012669208B2

(12) United States Patent
    Volker

(10) Patent No.: US 12,669,208 B2
(45) Date of Patent: Jun. 30, 2026

(54) METHOD AND APPARATUS FOR REINFORCING PIPING AND INSTALLING A PIPE ADAPTER

(71) Applicant: Todd A. Volker, Overland Park, KS (US)

(72) Inventor: Todd A. Volker, Overland Park, KS (US)

(73) Assignee: TruComp Pipe LLC, Ohawa, KS (US)

( * ) Notice: Subject to any disclaimer, the term of this patent is extended or adjusted under 35 U.S.C. 154(b) by 0 days.

(21) Appl. No.: 18/112,390

(22) Filed: Feb. 21, 2023

(65) Prior Publication Data

US 2023/0265959 A1 Aug. 24, 2023

Related U.S. Application Data

(60) Provisional application No. 63/312,257, filed on Feb. 21, 2022.

(51) Int. Cl.
| | |
|---|---|
| *F16L 47/02* | (2006.01) |
| *B29C 65/30* | (2006.01) |
| *F16L 9/133* | (2006.01) |
| *F16L 13/00* | (2006.01) |
| *F16L 47/22* | (2006.01) |

(Continued)

(52) U.S. Cl.
CPC .............. *F16L 47/02* (2013.01); *B29C 65/30* (2013.01); *F16L 9/133* (2013.01); *F16L 13/004* (2013.01); *F16L 47/22* (2013.01); *F16L 57/02* (2013.01); *F16L 57/06* (2013.01); *G01K 1/143* (2013.01); *B29K 2105/0872* (2013.01); *B29L 2031/24* (2013.01); *F16L 47/24* (2013.01)

(58) Field of Classification Search
CPC . F16L 57/02; F16L 57/06; F16L 47/22; F16L 13/004
See application file for complete search history.

(56) References Cited

U.S. PATENT DOCUMENTS

| | | | | | |
|---|---|---|---|---|---|
| RE27,144 | E | * | 6/1971 | Rubenstein | ............... F16L 9/08 |
| | | | | | 425/111 |
| 4,497,760 | A | * | 2/1985 | Sorlien | ................... B29C 73/10 |
| | | | | | 264/36.19 |

(Continued)

FOREIGN PATENT DOCUMENTS

| | | | | |
|---|---|---|---|---|
| DE | 19705327 A1 | * | 11/1997 | ............. B29C 65/00 |
| EP | 0008912 A1 | * | 3/1980 | |

(Continued)

OTHER PUBLICATIONS

"Benefits of Design" brochure, Composite Fluid Transfer LLC, 2022.

(Continued)

*Primary Examiner* — Matthew Troutman
*Assistant Examiner* — James A Linford
(74) *Attorney, Agent, or Firm* — Kelleher + Holland LLC

(57) ABSTRACT

A pipe adapter assembly joining first ends of two pipes. The adapter includes a temperature probe for measuring the temperature of a butt joint between the first ends of the two pipes, and a layer of reinforcement material wrapped around the joined ends of the pipes and the temperature probe. A pipe adapter is coupled to a second end of the first pipe, and covers least a portion of the adapter covers at least a portion of the reinforcement material.

7 Claims, 13 Drawing Sheets

(51) Int. Cl.

| | |
|---|---|
| *F16L 57/02* | (2006.01) |
| *F16L 57/06* | (2006.01) |
| *G01K 1/143* | (2021.01) |
| *B29K 105/08* | (2006.01) |
| *B29L 31/24* | (2006.01) |
| *F16L 47/24* | (2006.01) |

(56) References Cited

U.S. PATENT DOCUMENTS

| | | | | |
|---|---|---|---|---|
| 4,718,698 | A * | 1/1988 | Hill | B29C 66/91221 |
| | | | | 285/31 |
| 5,286,952 | A * | 2/1994 | McMills | B29C 66/71 |
| | | | | 285/21.2 |
| 6,386,237 | B1 * | 5/2002 | Chevalier | F16L 11/12 |
| | | | | 138/104 |
| 6,478,338 | B1 * | 11/2002 | Dalmolen | B29C 66/721 |
| | | | | 285/21.2 |
| 6,596,122 | B1 * | 7/2003 | Savitski | B29C 65/148 |
| | | | | 156/304.3 |

| | | | | |
|---|---|---|---|---|
| 2014/0334517 | A1 * | 11/2014 | Blundell | G01K 1/143 |
| | | | | 374/44 |
| 2021/0255145 | A1 * | 8/2021 | Antonio | G01N 29/043 |
| 2023/0191713 | A1 * | 6/2023 | Worrall | B29C 66/52292 |
| | | | | 219/535 |

FOREIGN PATENT DOCUMENTS

| | | | |
|---|---|---|---|
| EP | 0141675 | A1 * | 5/1985 |
| WO | WO 2022/103508 | A1 | 5/2022 |

OTHER PUBLICATIONS

"FlexSteel Connections" web page, FlexSteel Pipeline Technologies, Inc., https://www.flexsteelpipe.com/joining-steel.html.

"Swaging" YouTube video, FlexSteel Pipe, https://www.youtube.com/watch?v=fk5PL7bMYuA.

"Next Generation Line Pipe" brochure, FlexSteel Pipeline Technologies, Inc., FlexSteel Overview Brochure-07182016.

"Reliable Swage Process" video, FlexSteel Pipeline Technologies, Inc., https://www.flexsteelpipe.com/videos-swage-process.html.

* cited by examiner

METHOD AND APPARATUS FOR REINFORCING PIPING AND INSTALLING A PIPE ADAPTER

CROSS-REFERENCE TO RELATED APPLICATION

This application claims the benefit of U.S. provisional application Ser. No. 63/312,257, filed Feb. 21, 2022, titled METHOD AND APPARATUS FOR JOINING PIPE.

FIELD

The present invention relates generally to methods and devices for reinforcing piping to receive an adapter. More specifically, the invention comprises methods and apparatuses for reinforcing piping and installing an adapter so that non-metallic pipe can be joined to metallic pipe.

BACKGROUND

Various technologies exist for joining pipe. However, when it comes to joining non-metallic pipe, options are somewhat limited. A common method for joining plastic pipe involves heating the ends of the pipes to their melting points and then fusing the ends together. This technique is often referred to as "butt fusing" pipe. Butt fusion is a preferred way to join plastic pipes because it tends to be less expensive than buying mechanical joints and is relatively simple to do in the field. However, when dealing with certain non-metallic pipes, such as composite plastic pipes, attempts to butt fuse are generally not successful. Composite pipes have layered material that interferes with fusion of the heated ends. Also, non-bonded composite pipes cannot be butt fused because there is a void or annulus formed by the unbonded fiber layer. Often times, mechanical compression fittings, such as swage fittings, are the only way to successfully join composite pipe. However, swage fittings can be expensive and create internal stresses in the pipe, which can cause premature failures. What is needed in the industry is a method of joining pipe that is cost-effective, reliable, and not prone to failure. The present invention addresses that need.

SUMMARY

The present invention relates to methods of joining a non-metallic pipe to a metallic pipe. The methods may use one or more sheets of reinforcement material (e.g., pre-impregnated fiberglass, carbon fiber, or aramid fiber) bonded to an end of a pipe. The invention also comprises an apparatus that can heat the reinforcement material to facilitate bonding. Finally, the reinforced pipe can be fitted with an adapter or fitting that is connectable to the metallic pipe. One reason for adding reinforcement material to pipe prior to the adapter being installed is to help strengthen the area of the pipe where the adapter contacts the pipe. In many situations, adding an adapters to unreinforced pipe, particularly adapters that crimp onto the pipe, can result in weak points around the adapter. This weakness may lower the working pressure of the pipe system, and if the weakness is not recognized it can result in failure of a the pipe system. Wrapping the pipe with reinforcement material using the methods and apparatuses disclosed herein prior to adding the adapter helps strengthen the pipe.

An exemplary embodiment of the invention includes a pipe adapter assembly that includes a pipe, a layer of reinforcement material wrapped around an end of the pipe, and a pipe adapter installed on the end the pipe. At least a portion of the adapter may cover at least a portion of the reinforcement material. The pipe may be a composite pipe or other non-metallic pipe. The reinforcement material may include a heat activated resin and the material may be heated after it has been wrapped around the pipe. There may also be one or more grooves or other indentations formed in the pipes. A temperature probe may be located underneath the reinforcement material wrap. The adapter may include an inner piece and outer piece, where the inner piece fits inside the cavity of the pipe and the outer piece fits over the exterior of the pipe.

The invention may also include a method of reinforcing a pipe and adding an adapter which includes the following actions: wrapping an end of a pipe (such as a composite pipe) with a reinforcement material, placing the wrapped end in a pipe heating apparatus, heating the wrapped end in the pipe heating apparatus (where the heating causes the reinforcement material to bond to the pipe), allowing the wrapped pipe to cool and positioning a pipe adapter on the wrapped end of the pipe. Again, the adapter may include an inner piece and outer piece, where the inner piece fits inside the cavity of the pipe and the outer piece fits over the exterior of the pipe. At least a portion of the adapter may cover at least a portion of the reinforcement material. The reinforcement material may include a heat activated resin. Additionally, the method may include inserting a spacer into the wrapped end of the pipe prior to heating and then removing the spacer from the pipe later.

The method may include covering the reinforcement material with a protective material prior to placing the wrapped end in the pipe heating apparatus. Also, one or more grooves or other indentations may be formed in the pipe. A temperature probe may be placed underneath the reinforcement material wrap and against the pipe. The method may also include securing the adapter to the end of the wrapped pipe. Securing the adapter may be done by bending the adapter such that it presses against the reinforcement material and then compressing the pipe until it presses against the inner piece.

DETAILED DESCRIPTION

Figure 1:
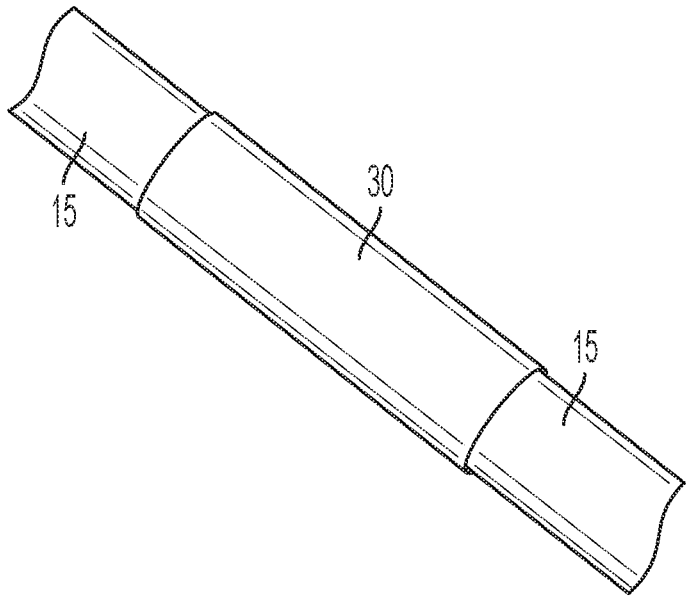
FIG. 1 is a perspective view of joined piping in accordance with the present disclosure.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the figures, an exemplary embodiment of the invention comprises a method 10 of joining segments of non-metallic pipe, such as a composite pipe 15, as well as a method 20 of joining a segment of non-metallic pipe, such as composite pipe 15, to a metallic pipe 25. Methods 10 and 20 may employ sheets of reinforcement material 30 such as pre-impregnated fiberglass fibers wrapped around an end of a pipe segment or joint. The reinforcement material 30 may be bonded to increase the strength of the wrapped area. Both methods may utilize a bonding apparatus 40 (also referred to herein as a heating apparatus) to facilitate application of the reinforcement material 30, with bonding apparatus 40 being another embodiment of the invention.

Figure 2:
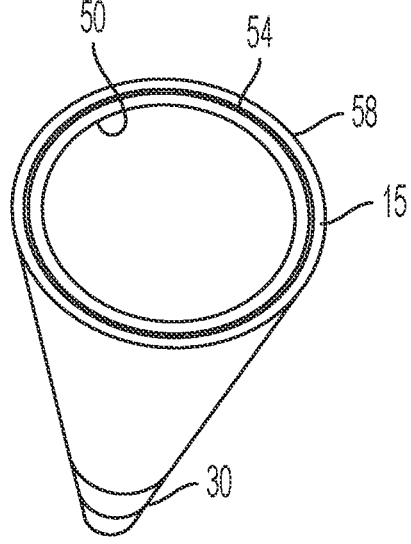
FIG. 2 is a perspective end view of the joined piping of FIG. 1.

As shown in the figures, method 10 for joining pipe results in two ends of a non-metallic pipe, such as a composite pipe 15, being joined together. The term "composite pipe" as used herein includes any non-metallic pipes having more than one type of material in the walls of the pipe including layers of materials. Materials that may be used in a composite pipe include fiber-reinforced plastic, glass reinforced plastic, high-density polyethylene, nylon, polyvinyl chloride, and polypropylene. Composite pipes include those pipes that are classified as bonded or non-bonded. In an exemplary embodiment, composite pipe 15 takes the form of a polyethylene pipe having one or more layers of fiber reinforcing material in the wall of the pipe 15. As shown in FIG. 2, composite pipe 15 may have an internal polyethylene layer 50 bonded with one or more intermediate layers of reinforcing fiber material 54 and then another outer polyethylene layer 58 bonded on top of the fiber material 54.

When used with composite pipe 15, method 10 for joining pipe includes a step 202 of welding two ends of composite piping 15 using what is sometimes referred to as a butt fusion technique. To butt fuse pipes 15, the ends being joined are separately heated until the material at the ends are somewhat pliable and/or slightly melted. The heated ends are then pressed together and held while they cool. There are a number of machines known in the art that can be used to butt fuse plastic pipes by melting the pipe ends against a central heating element and then compressing the melted ends together. The result is that the heated ends are welded together as the pliable plastic from one end fuses with the pliable plastic from the other end. The fused ends create a joint that often has a bead or ridge of excess melted material inside and outside the piping. While the process of butt fusing composite pipes is novel, the same type of machine used with plastic pipes can be used for the initial step of method 10, where the composite pipes 15 are fused together.

Figure 7:
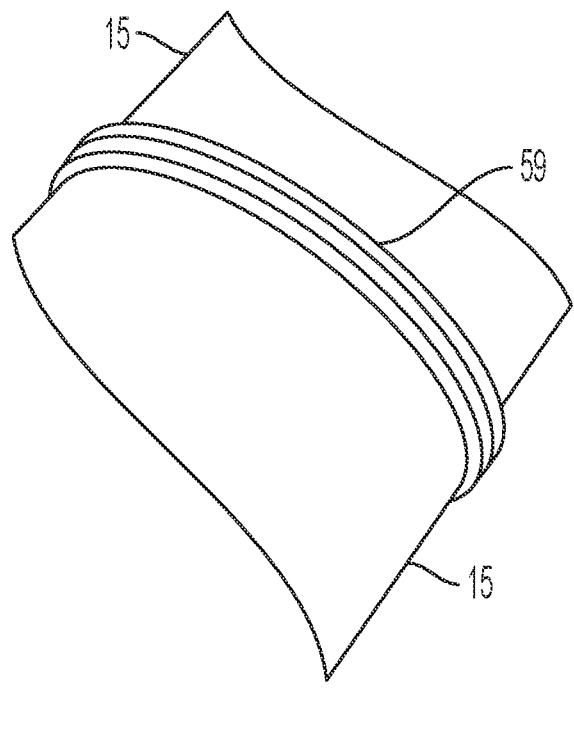
FIG. 7 is an enlarged partial view of a seam for fused piping.
Figure 8:
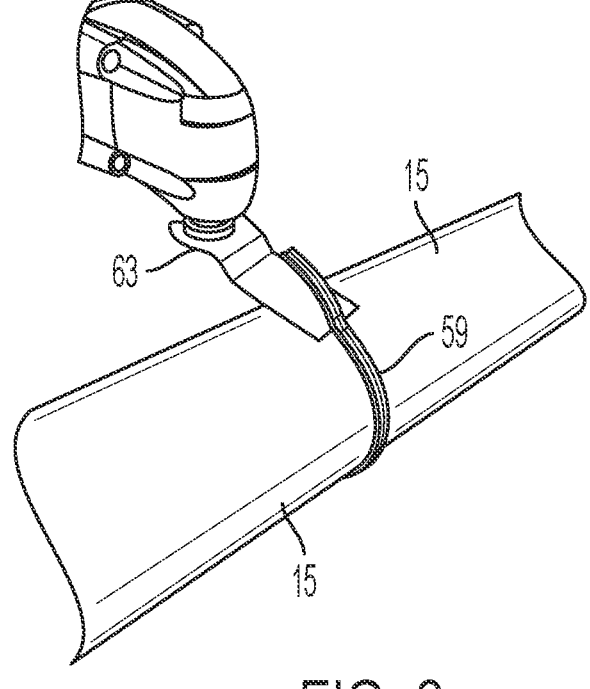
FIG. 8 shows a tool removing a portion of the seam of FIG. 7.
Figures 19, 20:
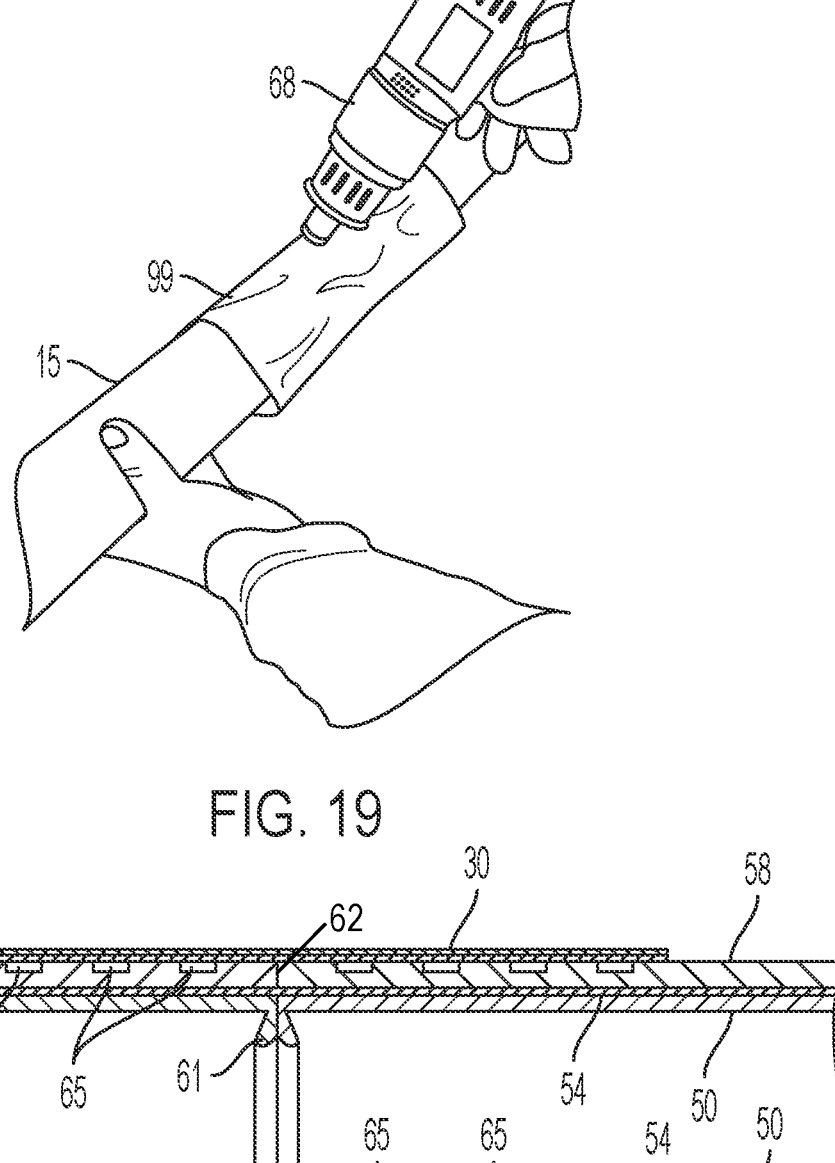
FIG. 19 is a perspective view of protective shrink film being applied to a pipe joint.
FIG. 20 is a cross section view of the joined piping of FIG. 1.
Figure 21:
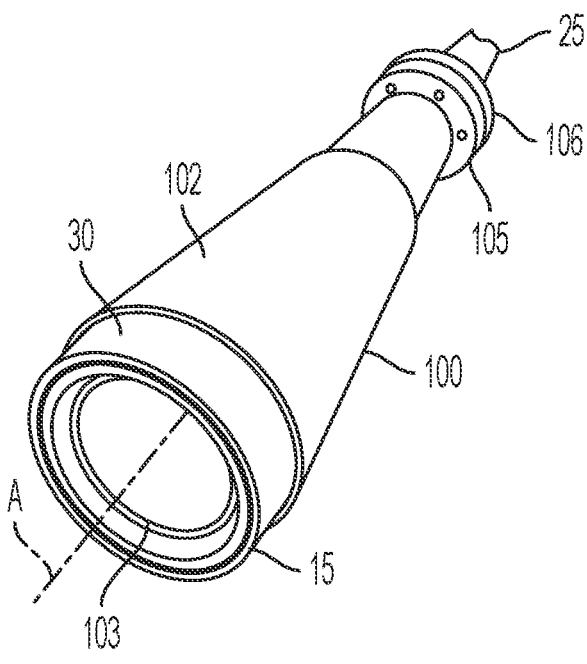
FIG. 21 is a perspective view of an adapter fitting at the end of a reinforced pipe in accordance with the present invention.
Figure 22:
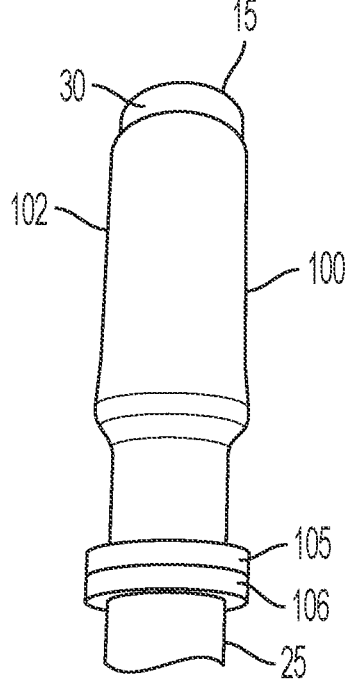
FIG. 22 is a top perspective view showing the adapter fitting and reinforced pipe of FIG. 21 connected to a metallic pipe.
Figure 23:
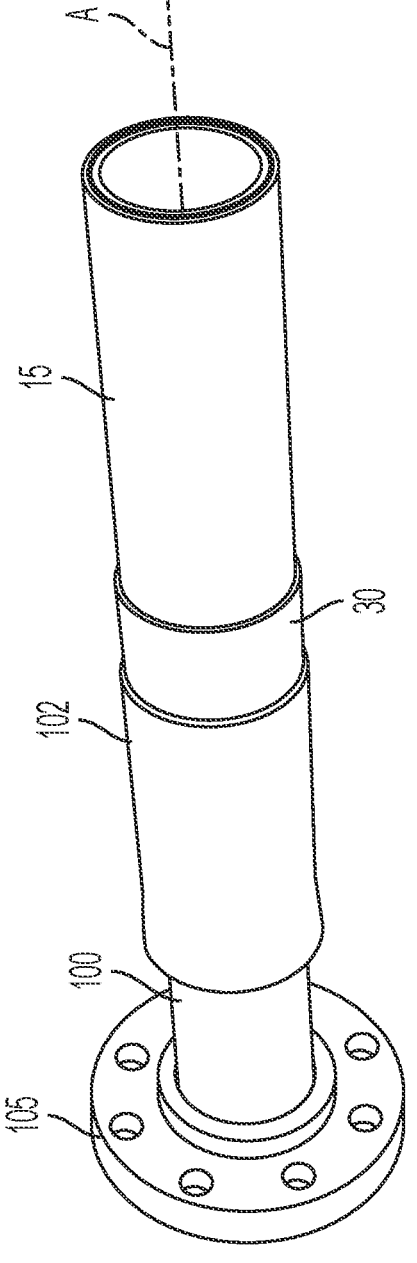
FIG. 23 is a top perspective view showing an adapter fitting at the end of a reinforced pipe.
Figures 24, 25:
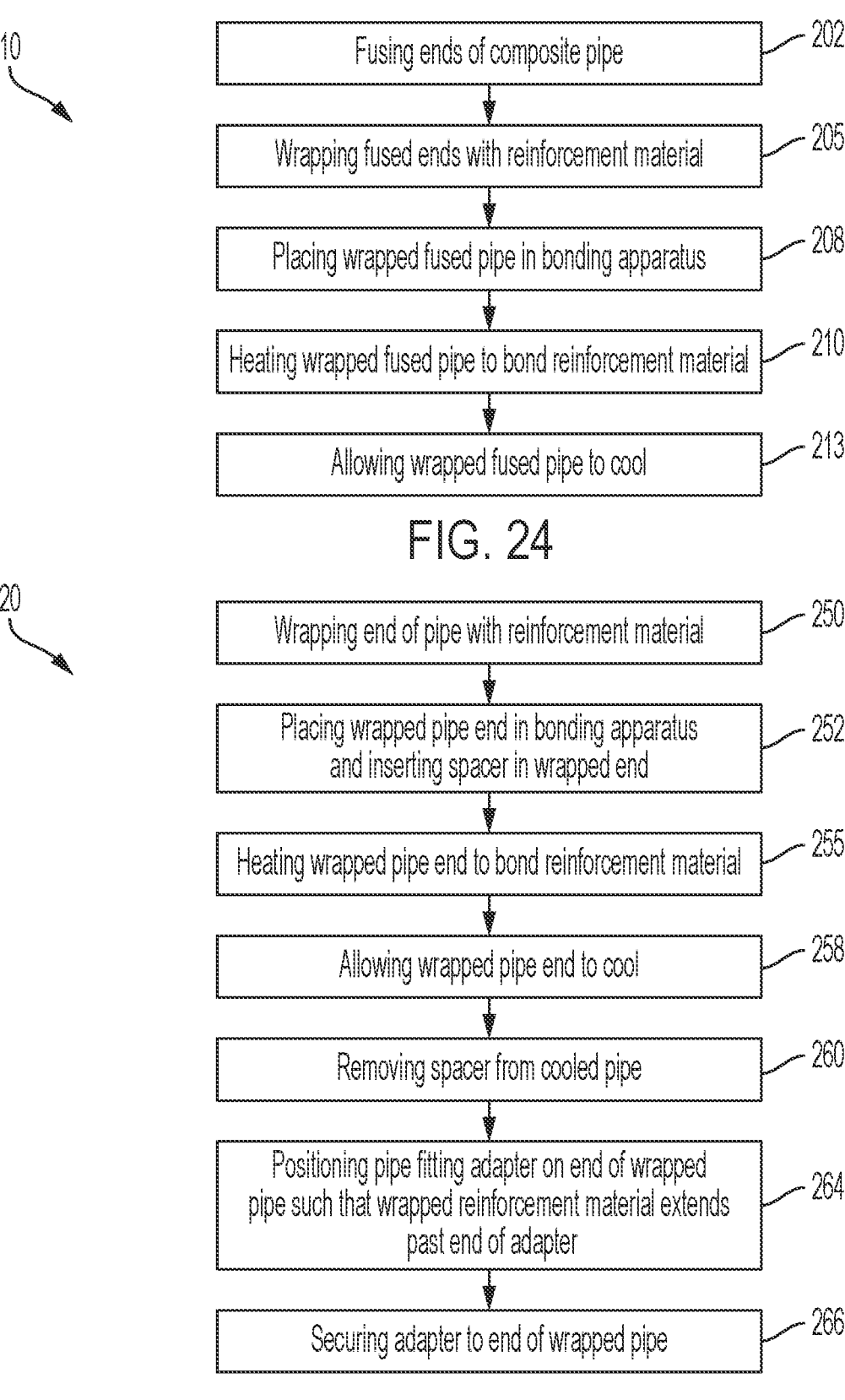
FIG. 24 is a diagrammatic representation of a process of joining pipe in accordance with the present disclosure.
FIG. 25 is a diagrammatic representation of a process of adding an adapter fitting to an end of reinforced pipe in accordance with the present disclosure.

As shown in FIG. 7, an outer ridge 59 is often created when composite pipes 15 are butt fused because the melted outer portions of the walls of the pipes tends to be driven outward when the heated ends are pressed together during the fusing process. Similarly, as shown in FIG. 20, an inner ridge 61 is often created when pipes 15 are butt fused because the melted inner portions of the walls of the pipes tend to be driven inward when the heated ends are pressed together during the fusing process. As shown in FIG. 8, the outer ridge 59 may be removed prior to moving to the next step in method 10 using a blade or saw such as ridge removal tool 63. Once the ridge 59 is removed, the seam 62 where the segments of pipes 15 are fused together is easy to see.

Figure 9:
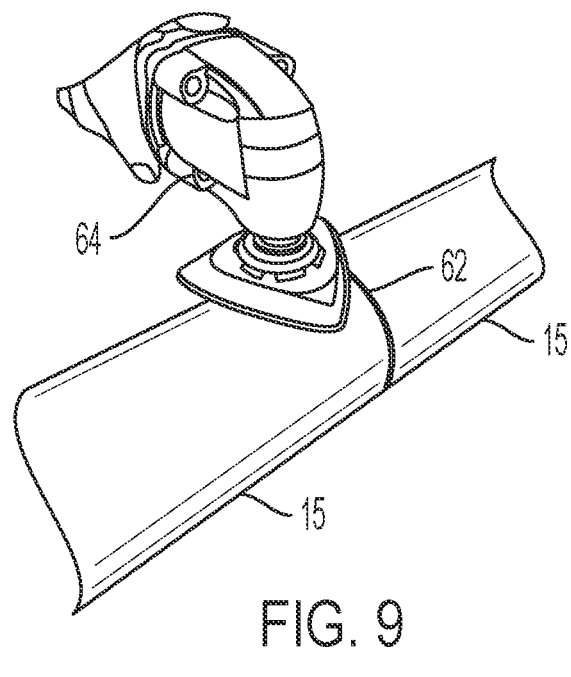
FIG. 9 shows a tool roughening an area around a pipe joint.
Figure 10:
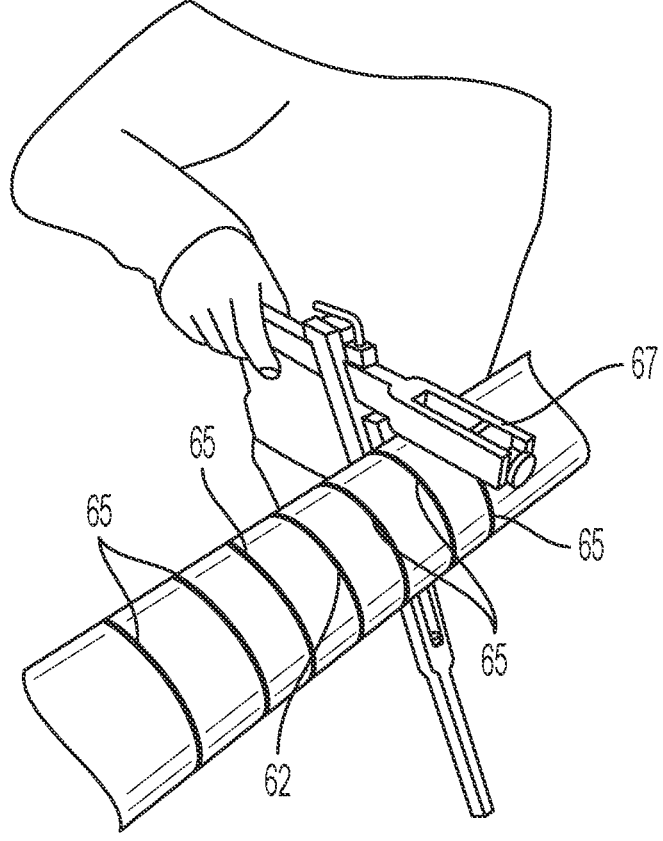
FIG. 10 shows a tool creating grooves in an area around a pipe joint.

One issue with butt fusing composite pipe is that the intermediate layer(s) of fiber material 54 does not bond as well as the plastic layers. This can make the fused joint weak and prone to failure unlike pure plastic (i.e., non-composite) piping. Accordingly, the joint can be reinforced by wrapping it with material. Before wrapping the joint, the outer surfaces of pipes 15 may be prepared so that the reinforcement material adheres to the pipes better. To prepare the pipes 15, the area around seam 62 may be roughened as shown in FIG. 9. The area may be roughened using any number of techniques including sandpaper or a sander 64. The pipes 15 may be roughened on both sides of the seam 62 (i.e., ends of both of the fused pipes 15) in the area where the joint will be wrapped. Roughening the pipes helps the reinforcement wrapping adhere to the pipes. As shown in FIG. 10, another preparation that may be done is forming circumferential grooves 65 around the outer walls of the pipes 15 proximate seam 62. The grooves 65 may encircle each pipe with a generally equal number of grooves 65 being formed on each side of the seam 62 (i.e., a generally equal number of grooves on the ends of both of the fused pipes 15). The number and size of grooves 65 will vary based on the pipe size and application. In an exemplary embodiment, three or four grooves 65 on each side of seam 62 would be sufficient. As best seen in FIG. 20, grooves 65 are typically only applied to the outer layer 58 of composite pipe 15, and the depth of grooves 65 are usually not deep enough to contact the intermediate layer of fiber material 54 of the pipe. A typical depth for a groove 65 is twenty five percent of the thickness of outer layer 58, although other depths may be necessary.

Figure 12:
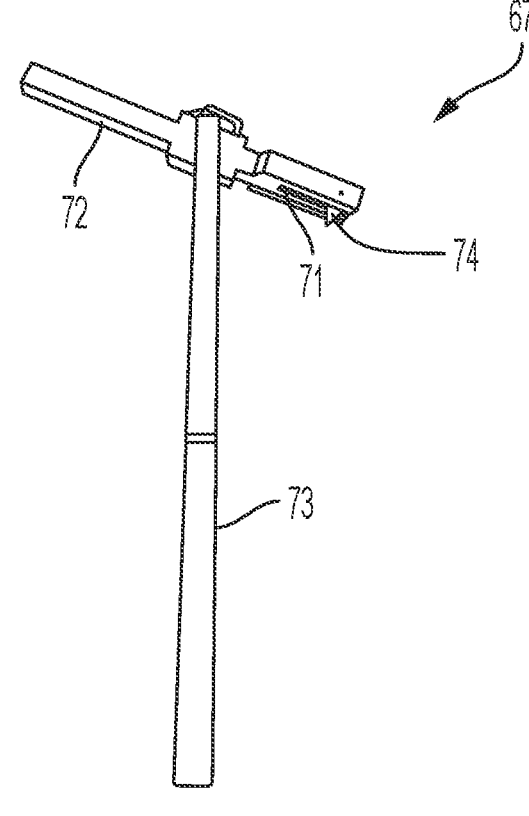
FIG. 12 is a perspective view of the tool of FIG. 10.

Each groove 65 may be formed using a groove tool 67. As shown in FIG. 12, groove tool 67 may include a long guide member 73 that extends downwardly from a cross member. The cross member may have an outer portion 72 and an inner portion 71, with a blade 74 extending downwardly from the inner portion 71. To use groove tool 67, the tool is placed such that the blade 74 and guide member 73 are in contact with pipe 15. The blade 74 can be forced into the outer layer 58 the desired depth and the tool can be rotated around the pipe 15 to create the groove around the circumference of the pipe. In addition to, or instead of, forming grooves 65, it is foreseen that other types of indentations or textures could be formed in pipes 15 including holes, striations, ridges, knurling, or other known indentations or textures.

Figure 13:
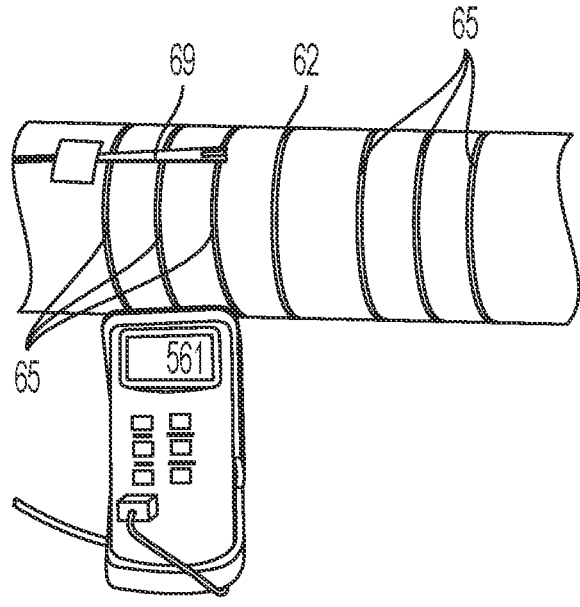
FIG. 13 is a perspective view of a temperature probe secured to the pipe joint of FIG. 10.
Figure 14:
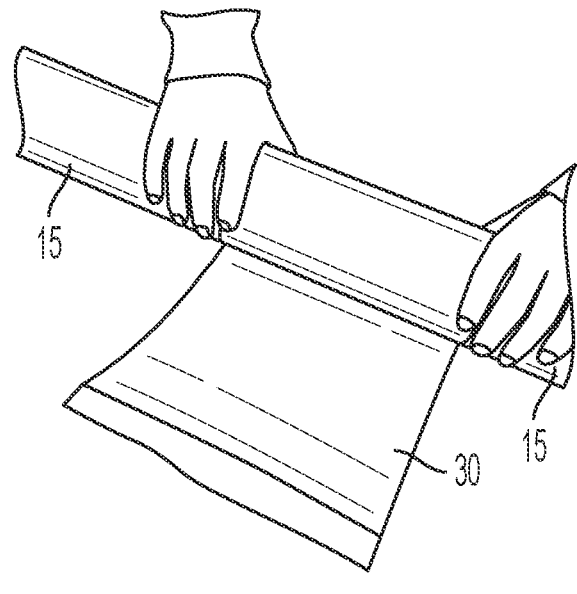
FIG. 14 is a perspective view of reinforcement material being wrapped around a pipe joint.

As shown in FIG. 13, a temperature probe 69 may be taped proximate the prepared area of the fused pipes 15 (e.g., the roughened and grooved area) such the probe will be located under the material that will be wrapped around the joint as reinforcement.

Method 10 includes the step 205 of wrapping one or more sheets of reinforcement material 30 around the butt fused joint. This may be done after the joint has been prepared roughening and forming grooves 65. The reinforcement material 30 may take the form of various materials, however pre-impregnated fiberglass fibers are believed to be a suitable material for many applications. For example, sheets of biaxial fiberglass having fibers oriented perpendicularly to one another (e.g., at zero and ninety degrees) may be used. Such sheets are sometimes referred to as 0/90 sheets. Various other types of reinforcement material may be used including any type of material that can adhere to the pipe area around the butt fused joint using resin, adhesion, chemical welding, or other types of bonding techniques. It is foreseen that bonding may be facilitated or activated by heat, water, or other activators. In an exemplary embodiment, fibers with heat activated resin may be used reinforcement material. Reinforcement material 30 may be wrapped snugly around the circumference of the joint. In other words, wrapping would occur around the longitudinal axes of pipes 15. The material may overlay temperature probe 69. The number of layers of reinforcement material 30 will depend on the application, however, in general, the strength of the joint will increase as the number of layers increase. In an exemplary embodiment, the number of layers of reinforcement material 30 will exceed the number of intermediate layers of fiber material 54 in the pipes 15. For example, if each pipe 15 includes six intermediate layers of reinforcing fiber material 54, there could be eight layers of reinforcement material 30 wrapped around the butt fused joint.

Reinforcement material 30 is wrapped snugly around the joint. To facilitate this, a continuous sheet of reinforcement material 30 may be wrapped around the joint after an end of the material has been bonded to pipes 15. If the reinforcement material 30 is pre-impregnated fiberglass, one way to bond the starting end of the material to pipes 15 is to use a heat gun 68 to heat the end of the material 30. The heat gun 68 can heat the pre-impregnated resin in the material 30 until it begins to melt and then the heated end of the reinforcement material 30 can then be pressed to the pipes 15 and allowed to cool. Once cooled, the previously heated resin in the reinforcement material 30 should be bonded to the exterior of the pipes 15. At that point, the reinforcement material 30 can be wrapped around the joint to create the desired number of layers.

Next, method 10 includes the step 208 of placing the wrapped portion of the butt fused pipes 15 in a bonding apparatus 40 (also referred to herein as a heating apparatus). Bonding apparatus 40 can be used to heat the wrapped reinforcement material 30 such that the layers of material 30 are bonded together, and the layers become bonded to the exterior of pipes 15. More specifically, the pre-impregnated resin in the wrapped reinforcement material 30 is heated until it begins to melt and the resin in the contiguous layers of material 30 melt together thus bonding the layers together. The melted resin also bonds with the exterior of pipes 15. When grooves 65 or other indentations are made in pipes 15, the melted resin may flow into the grooves 65 which also helps the reinforcement material 30 bond to the exterior of the pipes 15. As the heated resin cools, the bond becomes stronger. When the resin cools and starts to solidify in grooves 65, the cooled resin in the grooves forms a keyed joint which helps resist movement of the resin and the reinforcement material 30 with respect to pipe 15, particularly with respect to movement that is perpendicular to the groove (e.g., movement that would be longitudinal along the pipe). It is foreseen that a coating may be placed on the outside of pipes 15 under the wrapped reinforcement material 30 to assist with bonding of the material 30 to the pipes 15. It is also foreseen that reinforcement material 30 could be bonded using techniques other than heating, such as adhesive, epoxy, or chemical weld.

Figure 3:
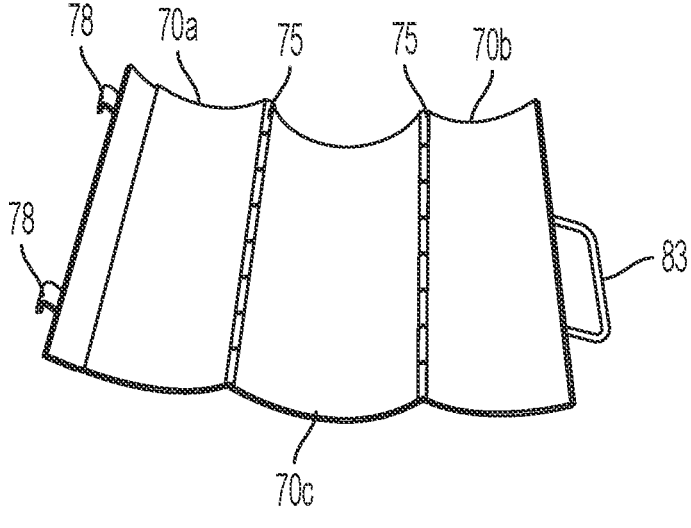
FIG. 3 is a perspective view of an apparatus used to create the pipe shown in FIG. 1, with the apparatus in an open configuration.
Figure 4:
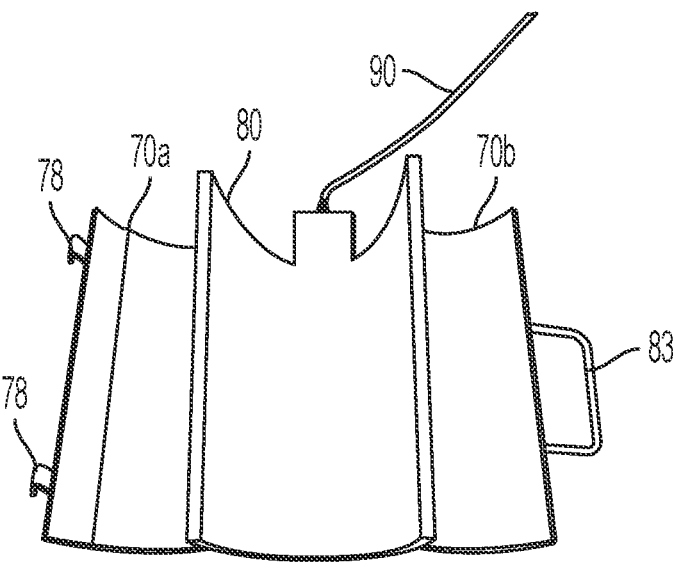
FIG. 4 is a perspective view of the apparatus of FIG. 3 with a heater installed.
Figure 5:
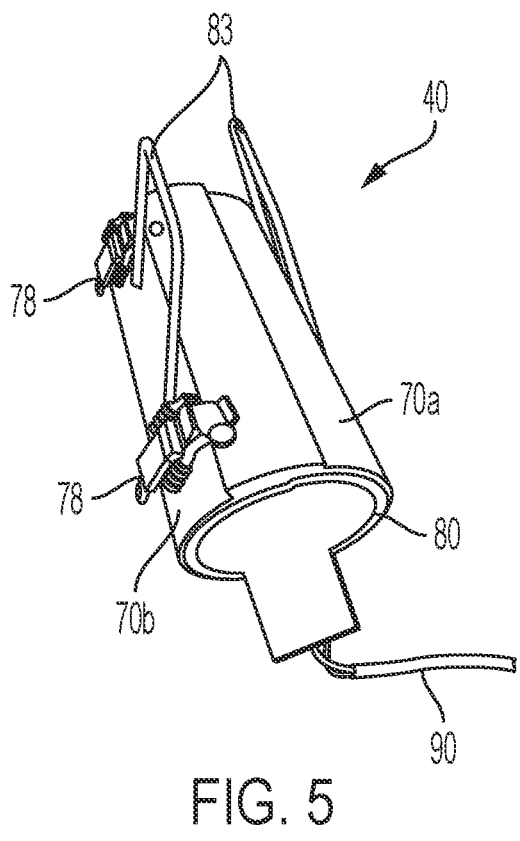
FIG. 5 is 3 is a perspective view of the apparatus and heater of FIG. 4, with the apparatus in a closed configuration.

As best seen in FIGS. 3 through 5, bonding apparatus 40 may have a generally cylindrical shell 70 with multiple segments. A first segment 70a and a second segment 70b of the shell may be connected to a middle segment 70c by hinges 75. As best seen in FIG. 5, in a closed position, the first and second segments 70a and 70b may be fastened together with a clamping mechanism 78. As best seen in FIG. 3, in an open position, the first and second segments 70a and 70b may be on opposite sides of middle segment 70c with the interiors of all segments facing upward.

Figure 16:
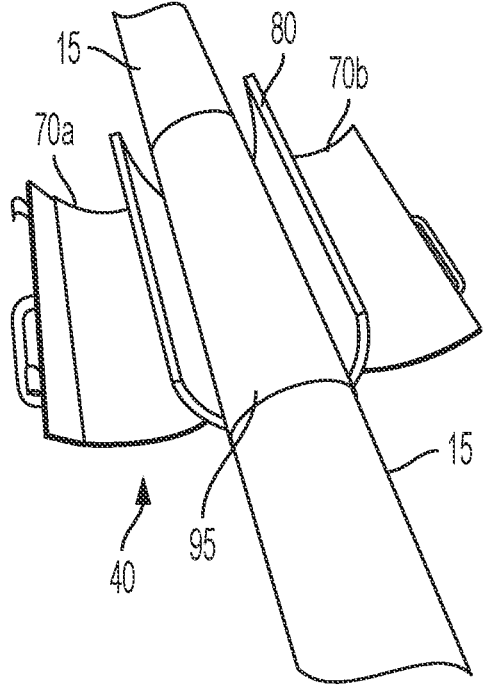
FIG. 16 is a perspective view of a pipe joint wrapped with reinforcement material and heat resistant material placed in the apparatus and heater of FIG. 4.
Figure 17:
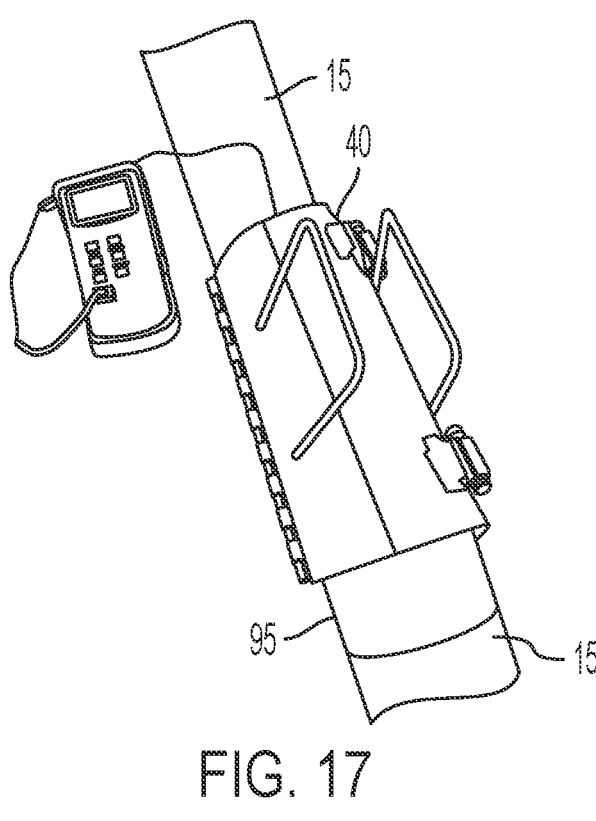
FIG. 17 is a perspective view a pipe joint wrapped with reinforcement material and heat resistant material and a temperature probe attached, with the wrapped pipe joint and probe located in the apparatus of FIG. 16 in a closed configuration.
Figure 18:
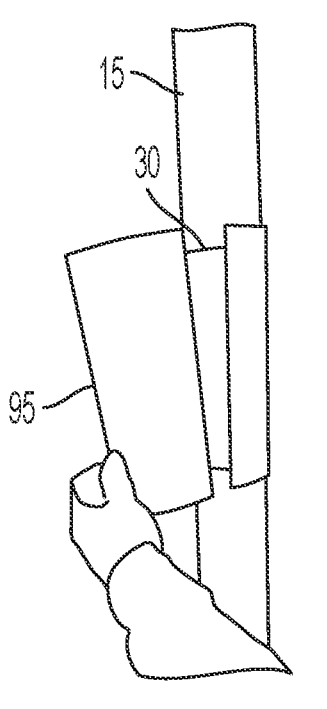
FIG. 18 is a perspective view of a heat resistant material being removed from the heated pipe joint of FIG. 17.

As best seen in FIGS. 4 and 16, a heater 80 may be placed inside shell. Various types of heaters may be used, however in an exemplary embodiment, heater 80 takes the form of a flexible mat. Heater 80 may be separate from shell 70 or it may be attached to one or more of the shell segments. Heater 80 is sized and shaped to generally wrap around the wrapped pipes 15 such that when the wrapped pipes 15 are placed in the bonding apparatus 40 and the shell 70 is closed, the heater 80 is in contact with a majority of the exposed reinforcement material 30. Heater 80 may have elastic properties so that it can be slightly compressed against the wrapped pipes 15 when shell 70 is closed. In other words, the shell 70 may press against heater 80 when the shell is closed such that the heater 80 compresses against the wrapped pipes 15 in the bonding apparatus 40. This helps to ensure that heater 80 is making sufficient contact with the wrapped pipes 15 to uniformly heat the pipes. It is foreseen that one or more heaters 80 may be used at the same time with a single bonding apparatus 40, such as situations where the heaters 80 are individually too small to wrap completely around the wrapped pipes 15. Bonding apparatus 40 may also include one or more handles 83 for easy transport.

Figure 6:
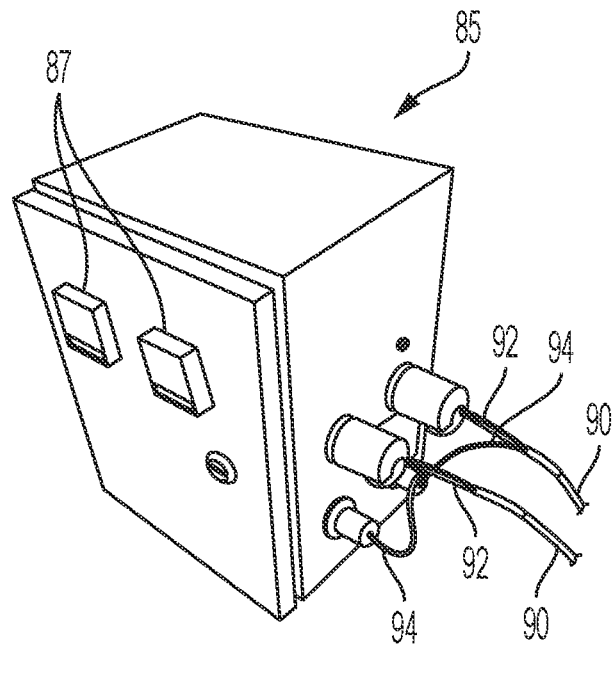
FIG. 6 is a perspective view of a control unit for the heater of FIG. 5.

As shown in FIG. 6, heater 80 may be powered and monitored by a control unit 85. Control unit 85 comprises a power supply and a controller that can measure and regulate the temperature of heaters 80. Various heater wattages can be used. In an exemplary embodiment, heater 80 may be 1500 watts. Control unit 85 may be battery powered or connected to a power generator, permanent power supply, or other type of electrical power supply. Control unit 85 can operate on a number of voltages include 120 volt. Control unit 85 may include a display 87 that identifies the heat of heater 80.

Heater 80 may each be connected to control unit 85 using a cable or cable bundle 90. If a cable bundle 90 is used, the bundle may include an electrical power cable 92 and a temperature control cable 94. Heater 80 may include an internal thermostat that provides temperature readings back to control unit 85 through their respective temperature control cable 94. Control unit 85 may then adjust the power being supplied to the heater to maintain a relatively consistent heater temperature. The operating temperature of the heater 80 may vary depending on a number of factors including the number of layers of reinforcement material 30 being heated, the size of the pipes 15, and the length of time that the wrapped joint is heated by bonding apparatus 40. Temperature probe 69 may be connected to a standalone monitor or control unit 85. Temperature probe 69 can be used to monitor the temperature at the wall of the pipes 15, beneath the reinforcement material 30, to ensure that the desired temperature is reached and maintained so that the resin in the material is properly heated. By properly heating the reinforcement material 30 and its resin, the bond between material 30 and pipes 15 can be maximized. Proper heating of the resin also ensures that resin is sufficiently molten to flow into grooves 65.

Figure 15:
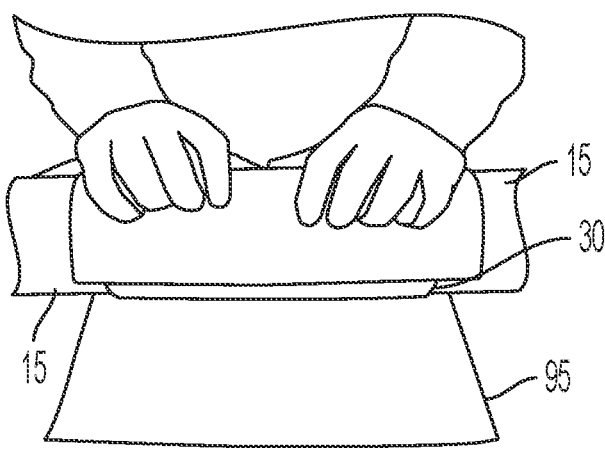
FIG. 15 is a perspective view of heat resistant material being wrapped around the reinforcement material that is wrapped around a pipe joint.

As shown in FIG. 15, a protective material 95 may be placed around the wrapped reinforcement material 30 prior to putting it in the bonding apparatus 40 to minimize the chance of something sticking to heater 80. Protective material 95 may be a heat resistant, non-stick material such as a Teflon® wrap. Without protective material 95 in place, the heated resin from reinforcement material 30 may stick to the heater thereby reducing its effectiveness or even causing damage. Once the protective material 95 has been placed around the wrapped reinforcement material 30, the entire assembly of protective material 95, reinforcement material 30, and butt fused pipes 15 may be placed into bonding apparatus 40.

Next, method 10 includes the step 210 of heating the wrapped fused pipes 15 to bond the reinforcement material to the pipes. To do this, apparatus 40 is placed in an open position with shell 70 opened. Heater 80 is located on the middle segment 70c of the shell and the wrapped butt fused pipe assembly is placed on the heater such that the butt fused joint is located approximately in the middle of the heater. Next, apparatus 40 is closed such that heater 80 is in full contact with the protective material 95. Segments 70a and

70b of the shell 70 may be fastened together with clamping mechanism 78 to secure the assembly in the apparatus 40. Heater 80 may then be heated to the desired temperature. As noted, the exact temperature depends on a number of factors, however in an exemplary embodiment the heater temperature may be 300 degrees Fahrenheit. The wrapped portion of the butt fused pipes 15 can be left in the apparatus 40 for a desired amount of time and the desired temperature. Temperature probe 69 can be monitored to ensure proper heating. It may be desirable to rotate the wrapped pipes 15 at least once during heating to minimize the chance of uneven heating which can be caused by a non-uniform heating element or faulty heater 80.

The wrapped butt fused pipe assembly is then left in the bonding apparatus 40 for a desired time to allow the resins to melt such that the layers of material 30 are bonded together, and such that the layers become bonded to the exterior of pipes 15 as discussed above. Again, the amount of time that the bonding apparatus heats the pipe assembly will depend on a number of factors. However, in an exemplary embodiment, a period of five minutes may be appropriate for heaters that are at 300 degrees Fahrenheit. That typically allows sufficient time for the pre-impregnated resin in the wrapped reinforcement material 30 to melt such that the contiguous layers of material 30 are bonded together as well as bonding the reinforcement material 30 to the exterior of pipes 15.

Method 10 also includes step 213 of allowing the fused pipe to cool. At the end of the timeframe, apparatus 40 is opened and the pipe assembly is removed and allowed to cool. The temperature probe 69 may be left in place and its cables cut at the point they disappear under the reinforcement material 30. Shortly after removing the pipe assembly, protective material 95 may be removed and saved for additional applications or discarded. Finally, the joint with bonded reinforcement material 30 may be covered with a shrink film to protect against deterioration of the joint and reinforcement material 30. As shown in FIG. 19, various types of heat activated shrink wrap 99 may be applied using heat gun 58.

Another embodiment of the invention comprises a method 20 of joining a segment of non-metallic pipe, such as composite pipe 15, to a metallic pipe 25. Method 20 is similar to method 10 in that it uses reinforcement material 30 wrapped around a composite pipe 15 and heated in bonding apparatus 40, but it differs from method 10 because it does not use a butt fusion technique. Method 20 also includes the attachment of an adapter such as a swaged coupler or fitting 100 (or other type of crimp fitting) to composite pipe 15 to facilitate connection to a metallic pipe 25.

Figure 11:
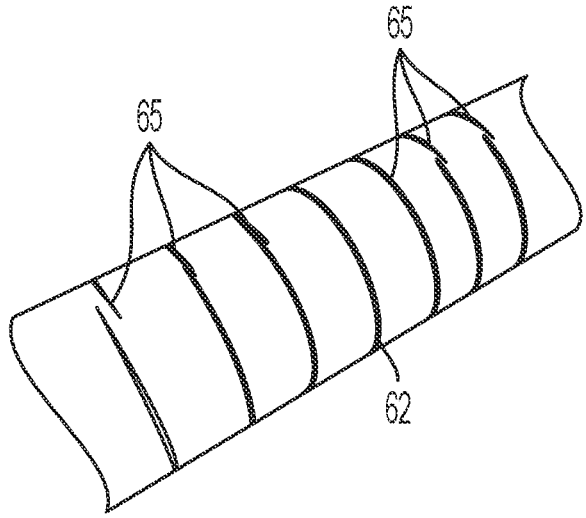
FIG. 11 is a perspective view of grooves in an area around a pipe joint.

Method 20 comprises a first step 250 of wrapping reinforcement material 30 around an end of composite pipe 15, similar to the way it is wrapped around the butt fused joint as described above. More specifically, one or more sheets of reinforcement material 30 may be wrapped around an end of a composite pipe 15 that has been prepared as discussed above. The prepared end may include roughening and forming grooves 65 or other indentations as discussed above and as shown in FIGS. 9 through 11. Grooves 65 may be formed using a groove tool 67 such as the one shown in FIG. 12.

The reinforcement material 30 may take the form of various materials, however pre-impregnated fiberglass fibers are believed to be suitable for many applications. For example, sheets of biaxial fiberglass having fibers oriented perpendicularly to one another (e.g., at zero and ninety degrees) may be used. Such sheets are sometimes referred to as 0/90 sheets. Reinforcement material 30 may be wrapped snugly around the circumference of the end of the pipe 15. The material may overlay temperature probe 69. The number of layers of reinforcement material 30 will depend on the application, however, in an exemplary embodiment, the number of layers of reinforcement material 30 will exceed the number of intermediate layers of fiber material 54 in pipe 15. For example, if pipe 15 includes six intermediate layers of reinforcing fiber material 54, there could be eight layers of reinforcement material 30 wrapped around the end.

Reinforcement material 30 is wrapped snugly around the end of pipe 15. To facilitate this, a continuous sheet of reinforcement material 30 may be wrapped around the end of pipe 15 after an end of the material has been bonded to pipe 15. If the reinforcement material 30 is pre-impregnated fiberglass, one way to bond the starting end of the material to the pipe 15 is to use a heat gun 68 to heat the end of the material 30. The heat gun 68 can heat the pre-impregnated resin in the material 30 until it begins to melt and then the heated end of the reinforcement material 30 can then be pressed to the pipe 15 and allowed to cool. Once cooled, the previously heated resin in the reinforcement material 30 should be bonded to the exterior of pipe 15. At that point, the reinforcement material 30 can be wrapped around the pipe end to create the desired number of layers.

Next, method 20 includes the step 252 of placing the wrapped portion of pipe 15 in bonding apparatus 40 and inserting an internal spacer inside the portion of the pipe that is wrapped. The internal spacer minimizes shrinkage of the diameter of the pipe during heating to keep the pipe at its nominal size for receiving an adapter such as a swaged coupler or fitting 100 once the pipe has cooled. Like method 10, bonding apparatus 40 can be used to heat the wrapped reinforcement material 30 such that the layers of material 30 are bonded together, and the layers become bonded to the exterior of pipe 15. More specifically, the pre-impregnated resin in the wrapped reinforcement material 30 is heated until it begins to melt and the resin in the contiguous layers of material 30 melt together thus bonding the layers together. The melted resin also bonds with the exterior of pipe 15. When grooves 65 or other indentations are made in pipe 15, the melted resin may flow into the grooves 65 which also helps the reinforcement material 30 bond to the exterior of the pipe 15. As the heated resin cools, the bond becomes stronger. When the resin cools and starts to solidify in grooves 65, the cooled resin in the grooves forms a keyed joint which helps resist movement of the resin and the reinforcement material 30 with respect to pipe 15, particularly with respect to movement that is perpendicular to the groove (e.g., movement that would be longitudinal along the pipe). It is foreseen that a coating may be placed on the outside of pipe 15 under the wrapped reinforcement material 30 to assist with bonding of the material 30 to the pipe 15. It is also foreseen that reinforcement material 30 could be bonded using techniques other than heating, such as adhesive, epoxy, or chemical weld.

A protective material 95 may be placed around the wrapped reinforcement material 30 prior to putting it in the bonding apparatus 40 to minimize the chance of something sticking to heater 80. Protective material 95 may be a heat resistant, non-stick material such as a Teflon® wrap. Without protective material 95 in place, the heated resin from reinforcement material 30 may stick to the heater thereby reducing its effectiveness or even causing damage. Once the protective material 95 has been placed around the wrapped reinforcement material 30, the entire assembly of protective material 95, reinforcement material 30, and pipe 15 (with internal spacer) may be placed into bonding apparatus 40.

Next, method 20 includes the step 255 of heating the wrapped portion of pipe 15 to bond the reinforcement material 30 to the pipe 15. To do this, apparatus 40 is placed in an open position with shell 70 opened. Heater 80 is located on the middle segment 70c of the shell and the wrapped pipe is placed on the heater such that most or all of the reinforcement material 30 will be heated. Next, apparatus 40 is closed around the assembly such that heater 80 is in full contact with the protective material 95. Segments 70a and 70b of the shell 70 may be fastened together with clamping mechanism 78 to secure the assembly in the apparatus 40. Heater 80 may then be heated to the desired temperature. As noted, the exact temperature depends on a number of factors, however in an exemplary embodiment the heater temperature may be 300 degrees Fahrenheit. The wrapped portion of the pipe 15 can be left in the apparatus 40 for a desired amount of time and the desired temperature. Temperature probe 69 can be monitored to ensure proper heating. It may desirable to rotate the wrapped pipe 15 at least once during heating to minimize the chance of uneven heating which can be caused by a non-uniform heating element or faulty heater 80.

The wrapped pipe assembly is left in the bonding apparatus 40 for a desired timeframe to allow the resins to melt such that the layers of material 30 are bonded together, and such that the layers become bonded to the exterior of pipe 15 as discussed above. Again, the amount of time that the bonding apparatus heats the pipe assembly will depend on a number of factors. However, in an exemplary embodiment, a period of five minutes may be appropriate for heaters that are at 300 degrees Fahrenheit. That typically allows sufficient time for the pre-impregnated resin in the wrapped reinforcement material 30 to melt such that the contiguous layers of material 30 are bonded together as well as bonding the reinforcement material 30 to the exterior of pipe 15.

Method 20 also includes step 258 of allowing the wrapped pipe to cool. At the end of the timeframe, apparatus 40 is opened and the pipe assembly is removed and allowed to cool. The temperature probe 69 may be left in place and its cables cut at the point they disappear under the reinforcement material 30. Shortly after removing the pipe assembly, protective material 95 may be removed and saved for additional applications or discarded. As the heated resin cools, the bond becomes stronger. Once the pipe has cooled, method 20 includes step 260 of removing the internal spacer from inside the pipe.

Once the wrapped pipe 15 has sufficiently cooled, the next step 264 of method 20 is to attach an adapter to the wrapped end of pipe 15 that allows connection to a metallic pipe 25. One such adapter is a swaged coupler or fitting 100 although other adaptors may also be used. As shown in FIG. 3, swaged fitting 100 may be installed over the reinforcement material 30 that has been bonded to pipe 15. Installing fitting 100 over the reinforcement material 30 lessens the chance of pipe failure compared to installing fitting 100 on an unwrapped end of pipe 15. Fitting 100 may be configured such that, when installed on pipe 15, it does not extend along the pipe past reinforcement material 30. In other words, reinforcement material 30 should visibly extend past fitting 100 on pipe 15 once the fitting is installed.

Method 20 also includes step 266 of securing the fitting or adapter on the end of the wrapped pipe 15. Swaged fitting 100 may be installed on pipe 15 by swaging or compressing an outer sleeve 102 against the reinforcement material 30 while an insert 103 is located inside pipe 15. The insert 103 supports the wall of pipe 15 while sleeve 102 is being compressed. When outer sleeve 102 is sufficiently compressed, the wall of pipe 15 (including part of reinforcement material 30) is sandwiched between sleeve 102 and insert 103. At this point, fitting 100 is fixed to pipe 15. Fitting 100 may include a flange 105, which can then be secured to a corresponding flange 106 on the metallic pipe 25 being connected to. A final step of method 20 is to connect composite pipe 15 to metallic pipe 25 by securing flange 105 to flange 106.

It is to be understood that while certain forms of the present invention have been illustrated and described herein, it is not to be limited to the specific forms or arrangement of parts described and shown.

The invention claimed is:

1. A pipe adapter assembly comprising:
   a first pipe having a first end and a second end and a second pipe having a first end;
   said first end of said first pipe adapted to be joined to said first end of said second pipe forming a butt joint;
   a temperature probe disposed within a probe recess formed in an exterior surface of said first pipe proximal said butt joint;
   a layer of reinforcement material wrapped around said first end of said first pipe and said first end of said second pipe such that said reinforcement material encapsulates said temperature probe and said butt joint; and
   a pipe adapter coupled to said second end of said first pipe, wherein at least a portion of said adapter includes an outer sleeve extending over and mechanically retaining at least a portion of said reinforcement material.

2. The pipe adapter assembly of claim 1, wherein said layer of reinforcement material is heated after said wrapping around said pipe.

3. The pipe adapter assembly of claim 2, wherein said reinforcement material includes a heat activated resin.

4. The pipe adapter assembly of claim 3, wherein said first pipe and said second pipe are composite pipes.

5. The pipe adapter assembly of claim 4, further comprising a groove formed in said pipe.

6. The pipe adapter assembly of claim 5, wherein said pipe adapter includes an outer piece and an inner piece.

7. The pipe adapter assembly of claim 6, wherein said inner piece fits within an interior cavity of said pipe.

* * * * *